United States Patent
Shin et al.

(10) Patent No.: US 7,200,147 B2
(45) Date of Patent: Apr. 3, 2007

(54) METHOD FOR ANALYZING ADDRESS FOR NEXT GENERATION INTEGRATED NETWORK SERVICE

(75) Inventors: HyunSoon Shin, Daejeon (KR); Sung Back Hong, Daejeon (KR)

(73) Assignees: Electronics and Telecommunications Research Institute (KR); Korea Telecom (KR)

( * ) Notice: Subject to any disclaimer, the term of this patent is extended or adjusted under 35 U.S.C. 154(b) by 1057 days.

(21) Appl. No.: 10/294,196

(22) Filed: Nov. 14, 2002

(65) Prior Publication Data

US 2003/0099244 A1    May 29, 2003

(30) Foreign Application Priority Data

Nov. 23, 2001   (KR) ..................... 10-2001-0073171

(51) Int. Cl.
   *H04L 12/28* (2006.01)
(52) U.S. Cl. ............. 370/392; 370/395.32; 370/395.52
(58) Field of Classification Search ..................... None
   See application file for complete search history.

(56) References Cited

U.S. PATENT DOCUMENTS

| | | | | |
|---|---|---|---|---|
| 5,689,499 | A * | 11/1997 | Hullett et al. | 370/235 |
| 6,205,146 | B1 | 3/2001 | Rochberger et al. | |
| 6,243,384 | B1 | 6/2001 | Eriksson et al. | |
| 6,553,015 | B1 * | 4/2003 | Sato | 370/331 |
| 6,570,868 | B1 * | 5/2003 | Cable et al. | 370/351 |
| 6,597,697 | B1 * | 7/2003 | Petersen | 370/395.64 |
| 6,618,397 | B1 * | 9/2003 | Huang | 370/474 |
| 6,661,795 | B1 * | 12/2003 | Adas et al. | 370/395.1 |
| 6,819,673 | B1 * | 11/2004 | Giroir et al. | 370/400 |
| 6,876,677 | B1 * | 4/2005 | Kise | 370/524 |
| 7,065,092 | B2 * | 6/2006 | Chen et al. | 370/395.52 |
| 7,065,093 | B1 * | 6/2006 | Kumar et al. | 370/401 |
| 2005/0141550 | A1 * | 6/2005 | Mauger et al. | 370/465 |

FOREIGN PATENT DOCUMENTS

| | | |
|---|---|---|
| KR | 1020000013859 | 3/2000 |
| KR | 1020010063094 | 7/2001 |

* cited by examiner

*Primary Examiner*—Andrew C. Lee
(74) *Attorney, Agent, or Firm*—Blakely Sokoloff Taylor & Zafman (57) ABSTRACT

The present invention provides an address analysis method for the next generation integrated network service. The address analysis method makes it possible to establish an outgoing or incoming call service in all kinds of address schemes while the integrated network interworks with a wired/wireless integrated network. The address analysis method for an integrated network service applied to an ATM, comprises the steps of: a)constructing an address analysis pointer determination database for determining an address analysis start pointer, and constructing an address analysis database for analyzing an address using the address analysis start pointer and a received address and an address information database for obtaining information of the address; b)determining an analysis start pointer in the address analysis pointer determination database by analyzing the received address information; and c)calculating an address information database link pointer by analyzing a corresponding address digit and the determined address analysis start link pointer of the address analysis database, and obtaining information of an address corresponding to the address information database link pointer.

10 Claims, 5 Drawing Sheets

FIG. 1

10
address analysis pointer determination DB

| 11 | 12 | 13 | |
|---|---|---|---|
| NPI(0000) | TON(000)/AFI | address start link pointer | }14 |
|  | TON(001)/AFI | EMPTY | |
|  | TON(010)/AFI | EMPTY | |
|  | TON(011)/AFI | EMPTY | |
|  | TON(100)/AFI | EMPTY | |
|  | TON(110)/AFI | EMPTY | |
| NPI(0001) | TON(000)/AFI | address start link pointer | |
|  | TON(001)/AFI | address start link pointer | |
|  | TON(010)/AFI | address start link pointer | |
| ⋮ | ⋮ | ⋮ | |
| NPI(1000) | TON(000)/AFI | address start link pointer | |
|  | TON(001)/AFI | address start link pointer | |
|  | TON(010)/AFI | address start link pointer | |
|  | TON(011)/AFI | address start link pointer | |
|  | TON(100)/AFI | address start link pointer | |
|  | TON(110)/AFI | address start link pointer | }14 |

METHOD FOR ANALYZING ADDRESS FOR NEXT GENERATION INTEGRATED NETWORK SERVICE

BACKGROUND OF THE INVENTION

1. Field of the Invention

The present invention relates to a method for analyzing an address for the next generation integrated network service, and more particularly to an address analysis method for the next generation integrated network service applicable to an integrated network for making it possible to establish an originating or terminating call service in all kinds of address schemes while the integrated network interworks with a wired/wireless integrated network, and a computer-readable recording medium for implementing the address analysis method.

2. Description of the Related Art

Typically, the Internet for providing people with much abundant information through the medium of a computer has been composed of numerous virtual spaces, each called a Web site. The Internet has been rapidly developed along with a variety of communication networks being also rapidly developed. As one of these communication networks, there has been proposed a PSTN (Public Switched Telephone Network) having numerous lines throughout the world.

As people's desires and technology required for more convenient living rapidly increase, many developers are intensively conducting research into a variety of new methods for more effectively use the Internet. One of the methods is a method for enabling a telephone, being a general main communication means, to be more conveniently used for surfing the Internet. Such a representative example is a commercial communication service such as an "Internet Phone" service or a "Dial Pad" service. Such typical techniques provide a user with a communication service over the Internet using a wide-range communication line and their own program on condition that the user clicks a phone number previously inputted or registered into the program.

The above techniques recognize a unique identifier (ID) related to a subscriber's address over a variety of communication networks as well as the Internet, request a destination terminal's identifier from a server, and establish interconnection setup between the server and the destination terminal using an address of a real destination terminal. As a network becomes complicated and various terminals have been developed, a complicated interconnectivity between servers may be formed and much effort for establishing a mutual interworking operation between protocols is needed.

In recent times, a recent trend of providing a subscriber with a convenience of use by integrating a variety of networks into one network requires an address analysis function conveniently applicable to an address scheme for supporting various kinds of protocols. In particular, at a current point of time having a development direction (i.e., a voice service, a data service, a wired/wireless integrated network service), there is a need for a new address analysis technique to be applicable to all kinds of address schemes, for example, an ITU-T (International Telecommunications Union Telecommunication) E.164 and E.191 or a NSAP (Network Service Access Point) defined by an ISO (International Organization for Standardization) 8348, etc.

However, as for a typical address analysis method, a PSTN system and an ISDN (Integrated Services Digital Network) system can respectively accommodate only an E.164 address scheme, and an ATM (Asynchronous Transfer Mode) system can accommodate only an NSAP address scheme. Such a typical address analysis method is applied to only a local area, so that an address analysis method of an overall integrated network becomes ineffective in the case where the typical address analysis method interworks with the next generation integrated network, resulting in difficulties in managing the integrated network and in providing an integrated network interworking service.

One representative example for solving the above difficulties is described in Korean Patent Application No. 1999-59968 ("INTEGRATED ATM NAMER SYSTEM CAPABLE OF SETTING UP SHORTCUT PATH IN NEXT GENERATION INTERNET AND METHOD THEREOF"), which is incorporated herein by reference. This method provides an originating call service on the Internet, provides traffics between a host destination and a router, and classifies the traffics into an IP (Internet Protocol) traffic, an IPoA traffic, and a pure ATM traffic according to characteristics of interfaces and the traffics in such a way that it provides a shortcut path in response to a destination address.

However, since the aforesaid method in Korean Patent Application No. 1999-59968 only considers an Internet network for providing an ATM-based Internet service capable of setting up a shortcut path used for an integrated destination name address analysis function, it has a limitation in analyzing an address accommodating all address schemes for establishing an integrated network interworking service, and further, and it is unable to design/construct/manage the next generation integrated network.

Another representative example is described in U.S. Pat. No. 6,243,384 ("Address Analysis for Asynchronous Transfer Mode Node with PNNI (Private Network-Network Interface) Protocol"), for storing PNNI protocol address information in an inactive mode, providing a call establishment state using an integrated table of an active mode upon receiving a network connection request, and thus effectively managing address information. However, this method has no address analysis method for accommodating all address schemes in case of being interoperable with the integrated network, resulting in a difficulty in managing the integrated network interworking operation.

SUMMARY OF THE INVENTION

Therefore, the present invention has been made in view of the above problems, and it is an object of the present invention to provide an address analysis method for accommodating all address schemes to establish originating and terminating call services with a network accommodating a predetermined address scheme for the next generation integrated network service.

It is another object of the present invention to provide a method for facilitating the design and construction of the next generation integrated network using an address analysis method accommodating all address schemes, and providing an effective integrated network management service.

In accordance with one aspect of the present invention, the above and other objects can be accomplished by the provision of an address analysis method for an integrated network service applied to an ATM (Asynchronous Transfer Mode) switching system wherein an ALS (ATM Central Switching Subsystem) and an ACS (ATM Central Switching Subsystem) are connected to each other, comprising the steps of:

a) constructing an address analysis pointer determination database for determining an address analysis start pointer, and constructing an address analysis database for analyzing an address using the address analysis start pointer and a received address and an address information database for obtaining information of the address; b) determining an analysis start pointer in the address analysis pointer determination database by analyzing the received address information; and c) calculating an address information database pointer by analyzing a corresponding address digit of the address analysis database, and obtaining information of an address corresponding to the address information database pointer.

In accordance with another aspect of the present invention, there is provided a computer-readable recording medium in an ATM (Asynchronous Transfer Mode) switching system having a processor, wherein an ALS (ATM Central Switching Subsystem) and an ACS (ATM Central Switching Subsystem) are connected to each other, comprising: a first function for constructing an address analysis pointer determination database for determining an address analysis start pointer, and constructing an address analysis database for analyzing an address using the address analysis start pointer and a received address and an address information database for obtaining information of the address; a second function for determining an analysis start pointer in the address analysis pointer determination database by analyzing the received address information; and a third function for calculating an address information database pointer by analyzing a corresponding address digit of the address analysis database, and obtaining information of an address corresponding to the address information database pointer.

BRIEF DESCRIPTION OF THE DRAWINGS

The above and other objects, features and other advantages of the present invention will be more clearly understood from the following detailed description taken in conjunction with the accompanying drawings, in which:

FIG. 2 depicts a database (DB) configuration in accordance with a preferred embodiment of the present invention, in more detail.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 1:
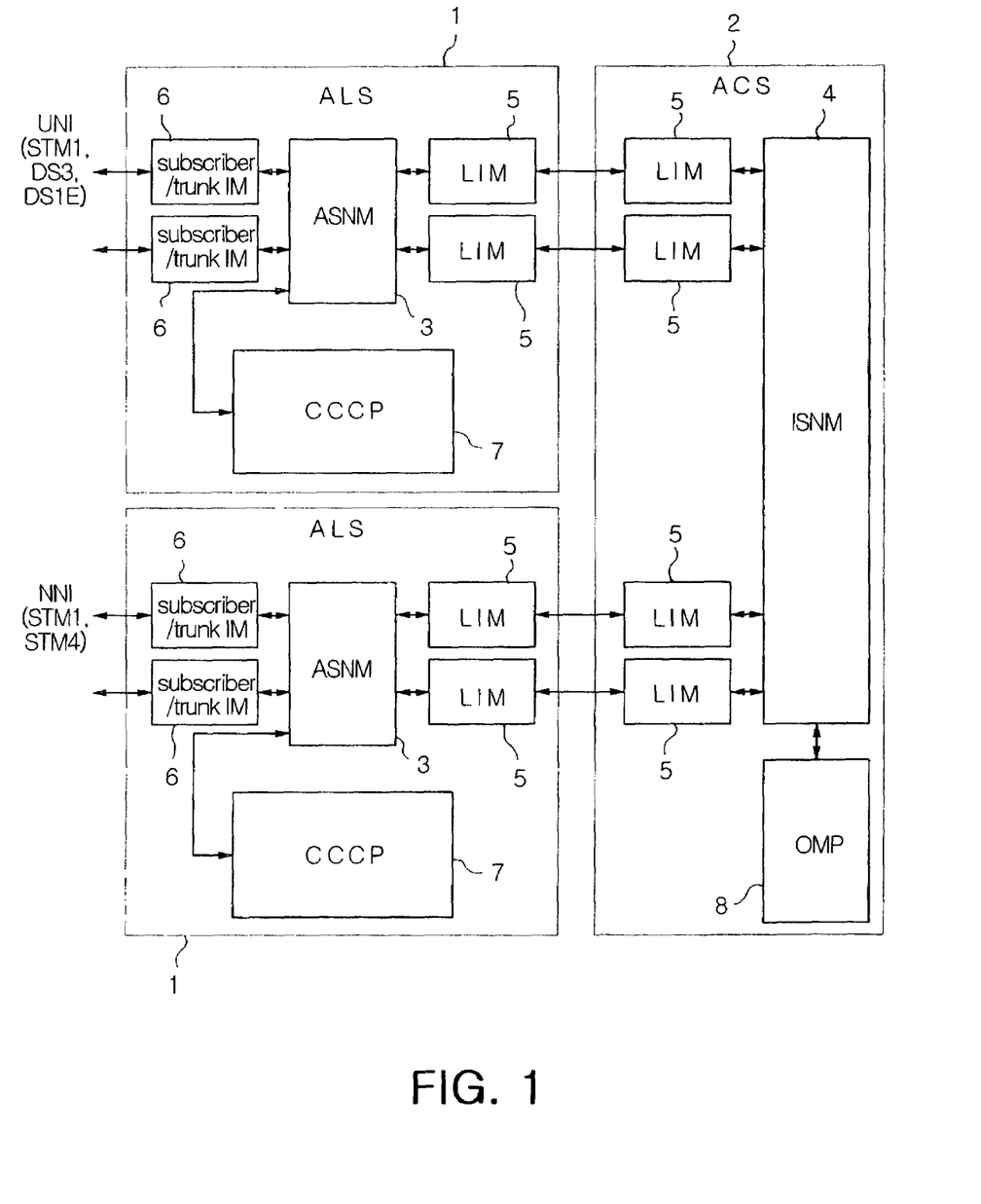
FIG. 1 is a view illustrating a block diagram of a subsystem of an ATM switching system in accordance with the present invention.

FIG. 1 is a view illustrating a block diagram of a subsystem of an ATM switching system in accordance with the present invention. Referring to FIG. 1, a subsystem of an ATM switching system according to the present invention includes a plurality of ALSs (ATM Local Switching Subsystem) 1 and an ACS (ATM Central Switching Subsystem) 2. The ATM switching systems are decentralized in units of the ALSs (ATM Local Switching Subsystems) 1, and are interconnected via the ACS (ATM Central Switching Subsystem) 2. A single ACS (ATM Local Switching Subsystem) 2 and two ALSs (ATM Local Switching subsystems) 1 are exemplarily depicted in FIG. 1, but a plurality of ALSs (ATM Local Switching subsystem) 1 may be used on behalf of the two ALSs.

Firstly, a transfer network includes an ASNM (Access Switch Network Module) 3 in the ALS (ATM Local Switching Subsystem) 1, an ISNM (Interconnection Switch Network Module) 4 in the ACS (ATM Local Switching Subsystem) 2, a plurality of LIMs (Link Interface Modules) 5 between the ASNM (Access Switch Network Module) 3 in the ALS (ATM Local Switching subsystem) 1 and the ISNM (Interconnection Switch Network Module) 4 in the ACS 2, and a plurality of IMs (Interface Modules) 6 for a subscriber/trunk.

A control network includes a CCCP (Call Connection Control Processor) 7 for processing a call connection control function and an OMP (Operation & Maintenance Processor) 8 for processing an operation/maintenance control function. The CCCP (Call Connection Control Processor) 7 contains a plurality of software modules for performing a variety of call connection control functions, a signal protocol process function, an access network link resource management function, a network node interface link resource management function, an internal switch link resource management function, a station number translation function, and a link and subscriber service profile data process function. The OMP (Operation & Maintenance Processor) 8 contains a plurality of software modules for performing a system operation/maintenance function, a called number translation function, a route control function, and a route and number data process function. The CCCP (Call Connection Control Processor) 7 communicates with the OMP (Operation & Maintenance Processor) 8 via a switch network module.

The CCCP (Call Connection Control Processor) 7 determines an address analysis pointer using a variety of databases (DBs) for address information and an address analysis in the case where there is an address analysis request signal in an ATM network, and determines an address start point using the determined address analysis pointer. Subsequently, the CCCP (Call Connection Control Processor) 7 analyzes a status of an address digit corresponding to the address start point, and searches desired address information according to the address digit status.

Figure 2A:
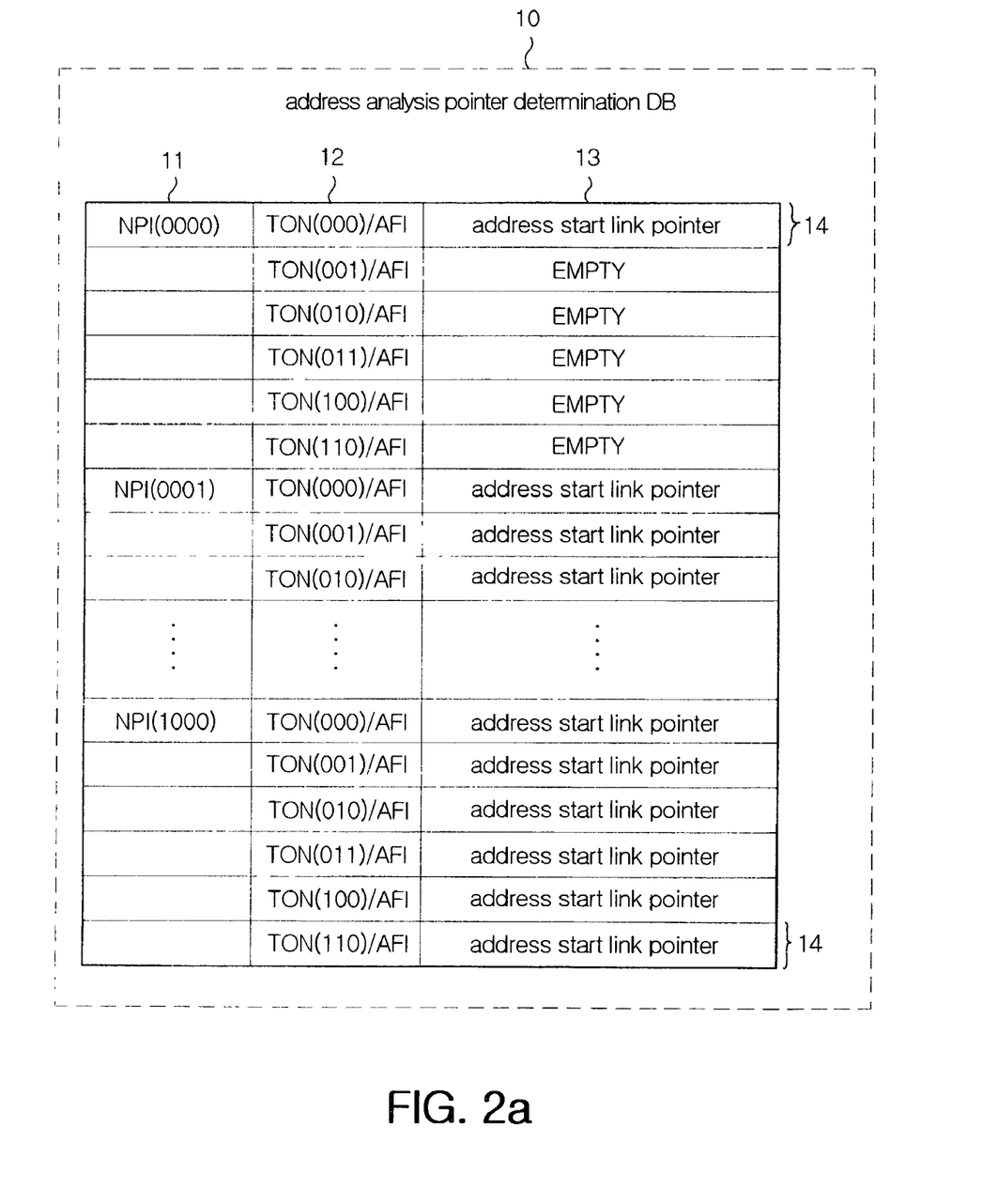
FIG. 2a depicts an internal configuration of an address analysis pointer determination database (DB) in accordance with a preferred embodiment of the present invention.
Figure 2B:
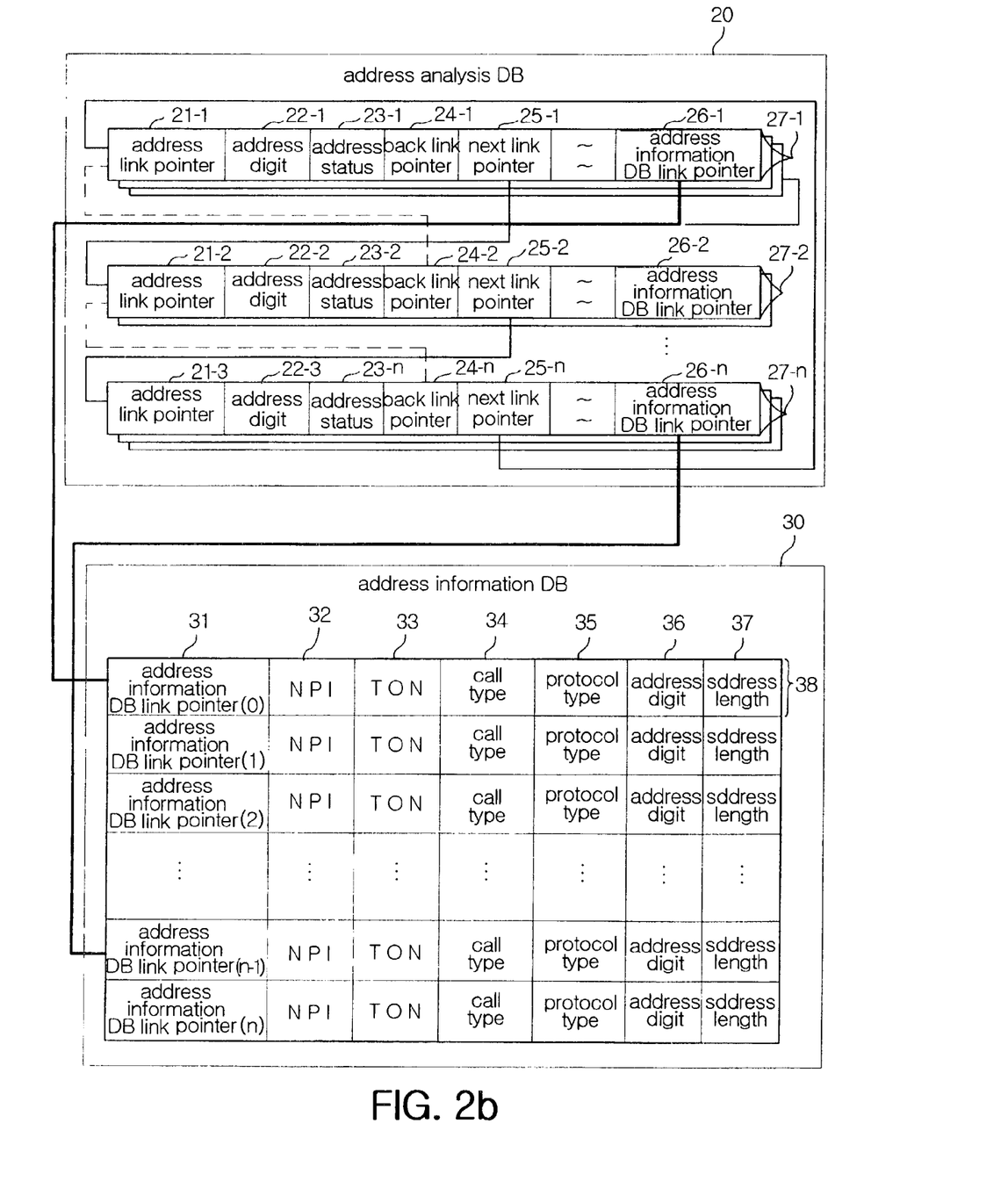
FIG. 2b depicts internal configurations of an address analysis database (DB) and an address information database (DB) in accordance with a preferred embodiment of the present invention.

As described above, such a database (DB) used for the address analysis and the address information is shown in FIG. 2. FIG. 2 depicts a database (DB) configuration in accordance with a preferred embodiment of the present invention, in more detail, FIG. 2a depicts an internal configuration of an address analysis pointer determination database (DB) in accordance with a preferred embodiment of the present invention, and FIG. 2b depicts internal configurations of an address analysis database (DB) and an address information database (DB) in accordance with a preferred embodiment of the present invention.

Referring to FIG. 2a, the address analysis pointer determination DB 10 includes a NPI (Numbering Plan Identifier) field 11 for indicating a terminal number scheme, a TON (Type Of Number) field 12 for setting a type of a number, and an address start link pointer field 13. The address start link pointer 13 is allocated to each tuple 14 according to key values of the NPI 11 and TON fields 12. The address analysis DB 20 shown in FIG. 2b is a double linked list structure where address digits are linked to each other, and includes an address link pointer field 21, an address digit field 22, an address status field 23, an address back link pointer field 24, an next address link pointer field 25, and an address information DB link pointer field 26. The next address link pointer field 25-1 of the first tuple 27-1 in the address analysis DB 10 indicates a address link pointer field 21-2 of next(second) tuple 27-2. Also, the next address link pointer field 25-2 of the second tuple 27-2 indicates a address link pointer field 21-n of the n-th(last) tuple 27-n.

The address information DB 30 shown in FIG. 2b is constructed as a sequential structure by the number of addresses capable of being accommodated in a system, and is composed of N number of tuples 38. The address information DB link pointer 26 of the address analysis DB 20 is used as a key to access a corresponding tuple 38. The tuple 38 includes an address information DB link pointer 31, a NPI 32, a TON 33, a call type 34, a protocol type 35, an address digit 36, and an address length 37, etc.

As described above, the address analysis pointer determination database (DB) 10 is assigned an address start link pointer 13 corresponding to each tuple 13 according to values of the NPI and TON fields 11 and 12. Two key values are determined on the basis of values of the NPI 11 and TON fields 12, thereby determining the address start link pointer 13 according to the determined two key values. That is, in the case where there is an address analysis request signal in an ATM network, an NPI (Numbering Plan Identifier) 11 and a TON (Type Of Number) 12 of address information are checked in the address analysis pointer determination DB 10. As shown in the address analysis pointer determination DB 10 of FIG. 2a, the NPI field 11 determines three first key values, and a second key value of each first key value is determined on the basis of the TON field 12. For example, if a NPI is an address scheme being not assigned, i.e., a type 'unknown', a first key value is '0'. If an NPI is an ISDN address scheme, a first key value is '1'. If an NPI is a NSAP address scheme, a first key value is '2'. Likewise, a first key value is determined as one of three values 0, 1 and 2 on the basis of a value of the NPI field 11. In addition, if a TON is in a type 'unknown' for indicating not assigned type, a second key value is '0'. If a TON is a type 'international' for indicating an international number, a second key value is '1'. If a TON is a type 'national' for indicating a national number, a second key value is 2. If a TON is in a type 'specific' for indicating a specific setup number, a second key value is 3. If a TON is in a type 'subscriber' for indicating a terminal number, a second key value is 4. Likewise, a second key value is determined as one of five values 0, 1, 2, 3 and 4. In this case, as shown in FIG. 2a, if a TON is in a type 'unknown' on condition that the NPI is in a type 'unknown', the address start link pointer 13 exists. If the TON is 'international', 'national', 'specific', or 'subscriber' on condition that the NPI is in a type 'unknown', there is no address start link pointer 13. That is, this means that such key value does not exist.

An address start link pointer 13 of each tuple 14 is determined on the basis of the determined two key values. Herein, the address start link pointer 13 is connected to the first address link pointer 21-1 of the first tuple 27-1 inside of the address analysis DB 20 of FIG. 2b. That is, the address start link pointer 13 of the address analysis pointer determination DB 10 indicates the first address link pointer 21-1 of the first tuple 27-1. As described above, the address link pointer 21-2 of the second tuple 27-2 is indicated on the basis of the first next address link pointer 25-1 of the first tuple 27-1. The tuple 27 contains a plurality of information such as the address link pointer 21, an address digit 22, an address status 23, a back address link pointer 24, and the next address link pointer 25, etc., and is assigned an address information DB link pointer field 26. Herein, the address information DB link pointer 26 is connected to an address information DB link pointer 31 of each tuple 38 inside of the address information DB 30.

Referring to FIG. 2b, an address digit status 23-1 is analyzed by accessing a first tuple 27-1 using a first address digit 22-1 among many input address digits. In the case where the address status 23-1 is connected to the next address digit 22-2, a value of the next address link pointer 25-1 is connected to an address link pointer 21-2 of a tuple 27-2 corresponding to the next address digit 22-2 in such a way that a digit link toward the next tuple 27 is provided and a continuous link structure between digits is also provided. An address status 23-n of a tuple 27-n corresponding to the last digit is marked as the end of a link. A back address link pointer 24-2 of the tuple 27-2 is connected to an address link pointer 21-1 of the front tuple 27-1 in such a way that digits are backwardly linked to each other. An address information DB link pointer 26 of the last tuple 27 is connected to an address information DB link pointer 31 of a corresponding tuple 38 of the address information DB 30 in such a way that a relationship between the address analysis DB 20 and the address information DB 30 is maintained.

Figure 3:
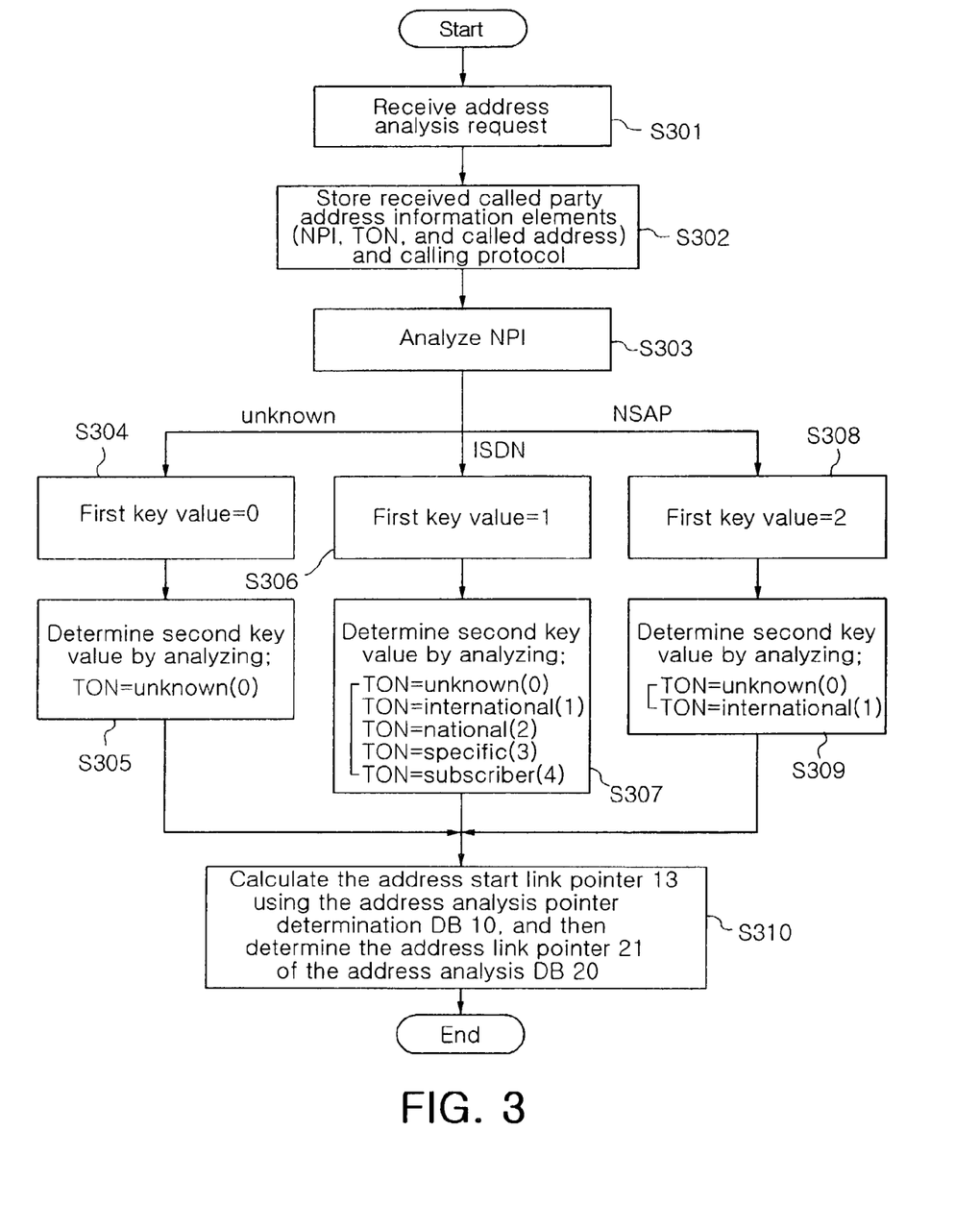
FIG. 3 is a flow chart illustrating a procedure for determining an analysis start pointer of an address analysis database (DB) in accordance with the present invention.

A method for obtaining an address analysis start pointer using a database (DB) of FIG. 2a will hereinafter be described with reference to FIG. 3. FIG. 3 is a flow chart illustrating a procedure for determining an analysis start pointer of an address analysis database (DB) in accordance with the present invention.

Referring to FIG. 3, if an ATM network receives an address analysis request signal at step S301, an NPI, TON, and called party number among the received called/calling party number information elements and a calling protocol type are stored at step S302. Subsequently, the stored NPI is analyzed at step S303. One of steps S304, S306, and S308 is performed on the basis of the analysis result of the step S303.

If the NPI is an unknown address scheme 'unknown' at step S303, a program goes to step S304 where a first key value is set to '0'. As previously typed, since a TON is in a type 'unknown' on condition that the NPI is in a type 'unknown', a second key value is set to '0' by analyzing the TON at step S305. Therefore, address start link pointer 13 is calculated using the address analysis pointer determination DB 10 on condition that first and second key values are '0', and then the first address link pointer 21-1 of the first tuple 27-1 inside the address analysis DB 20 is determined at step S310 because the first address link pointer 21-1 is equal to the calculated address start link pointer 13.

But, if the NPI is an ISDN address scheme, a program goes to step S306 where a first key value is set to '1'. The TON is analyzed in step S307. In this case, if the TON is a non-setting number 'unknown' at step 307, a second key value is set to '0'. If the TON is an international number 'international' at step S307, a second key value is set to '1'. If the TON is a national number at step S307, a second key value is set to '2'. If the TON is a specific number 'specific' at step S307, a second key value is set to '3'. If the TON is a terminal number 'subscriber' at step S307, a second key value is set to '4'. Likewise, the address start link pointers 13 and the first address pointer 21-1 of the address analysis DB 20 are calculated using the address analysis pointer determination DB 10 on the basis of two key values of each pair of NPI and TON at step S310.

In the meantime, if the NPI is a NSAP address scheme at step S303, a program goes to step S308 where the first key value is set to '2'. Then, the TON is analyzed at step S309. In this case, if the TON is a non-setting number 'unknown' at step 309, a second key value is set to '0'. If the TON is an international number 'international' at step S309, a second key value is set to '1'. Then, address start link pointers 13 and the first address link pointer 21-1 of the address analysis DB 20 are calculated using the address analysis pointer determination DB 10 on the basis of two key values of each pair at step S310. As described above, the second, third, . . . , last address link pointer 21-2, 21-3, . . . , 21-n of the address analysis DB 20 are determined the next address link pointer 251, 25-2, . . . , 25-(n–1) of the front tuple 27-1, 27-2, . . . , 27-(n–1) respectively.

An address analysis procedure and an address information calculation procedure using the address link start pointer 21 of the address analysis DB 20 and the received address will hereinafter be described with reference to FIG. 4.

Figure 4:
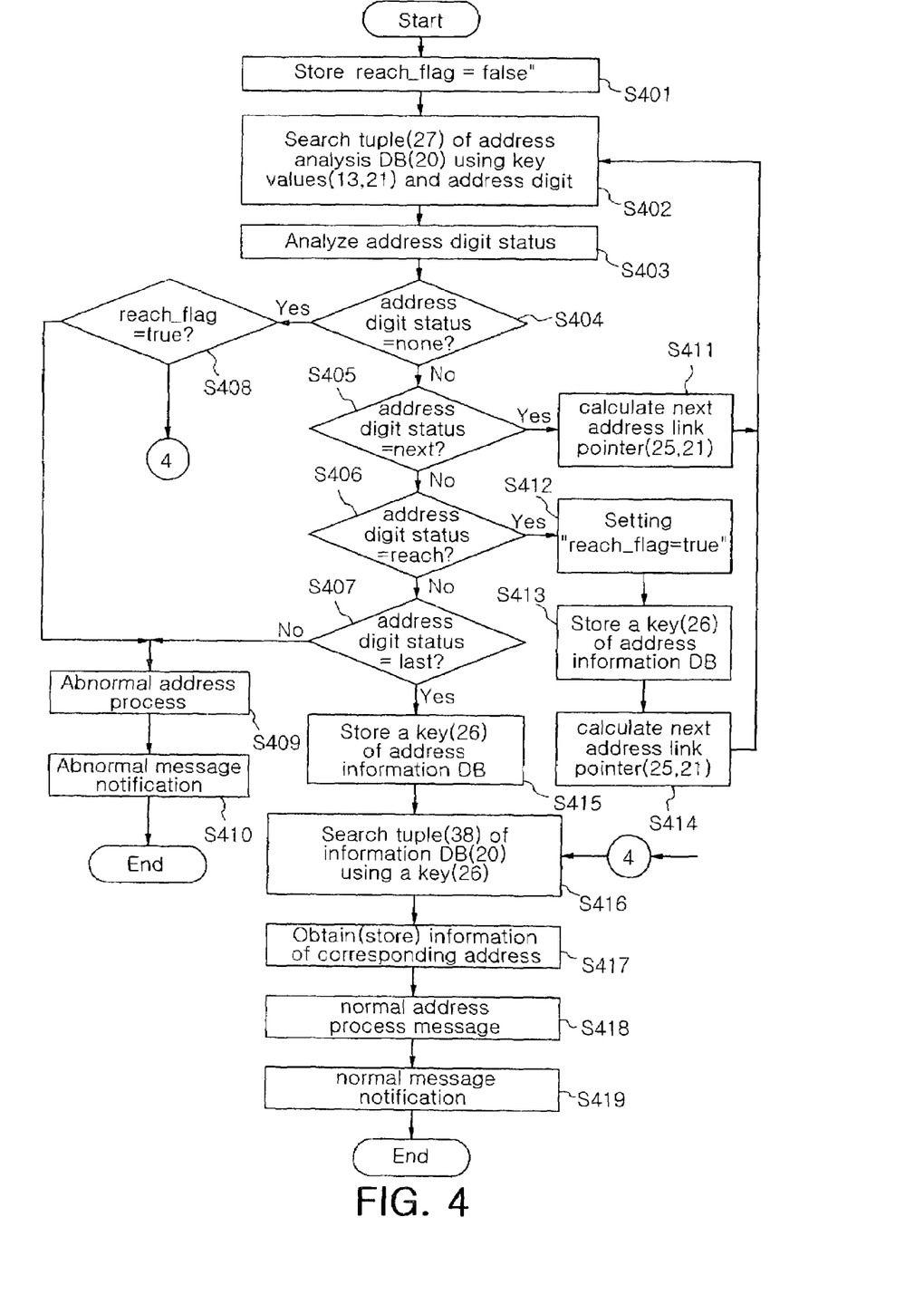
FIG. 4 is a flow chart illustrating a procedure for processing an address analysis result after analyzing an address in accordance with the present invention.

FIG. 4 is a flow chart illustrating a procedure for processing an address analysis result after analyzing an address in accordance with the present invention.

Referring to FIG. 4, by using the address analysis DB 20, a reach_flag is set to a false state 'false' at step S401. Herein, the reach_flag indicates an analysis result state of an address digit. In the case where a complete number at which the address digit is connectable is determined, the reach_flag indicates a state 'true'. In the case where an incomplete number is determined, the reach_flags indicates a state 'false'. Subsequently, the address start link pointer 13, i.e., an address link pointer 21 of the address analysis DB 20, is adapted as a first key, and an address digit is adapted as a second key in such a way that a corresponding tuple 27 of the address analysis DB 20 is searched at step S402. Then, a status of the address digit is analyzed, so that each address digit is analyzed at step S403.

Upon receiving the analyzed result of the step S403, it is determined whether the address digit status is 'none' at step S404. If the address digit status is 'none' at step S404, it is determined whether the reach_flag is 'true' at step S408. If the reach_flag is 'false' at step S408, a program goes to step S409 where an abnormal address process is performed. And, an abnormal process message is generated at step S410, and then a program is terminated. On the contrary, if the reach_flag is 'true' at step S408, a corresponding tuple 38 of the address information DB 30 is searched using a key value 26 stored in the address information DB 30 at step S416, and then corresponding address information required for a call control operation is obtained at step S417. Subsequently, a normal address process message is arranged at step S418, an execution success message is generated at step S419, and finally a program is terminated.

In the meantime, if it is determined that the address digit status is not the state 'none' at step S404, a program goes to step S405 where it is determined whether the address digit status is 'next' at step S405. If the address digit status is 'next' at step S405, an address link pointer 25 is obtained from the address analysis DB 20 at step S411, a program returns to step S402 so that steps after the step S402 are repeated.

However, if the address digit status is not 'next' at step S405, a program goes to step S406 where it is determined whether the address digit status is 'reach'. If the address digit status is 'reach' at step S406, the reach_flag is set as a state 'true' at step S412, and the address information DB link pointer 26 of the address information DB 30 is obtained and stored at step S413. Then, an address link pointer 21 is obtained at step S414, a program returns to step S402 so that steps after the step S402 are repeated.

On the other hand, if the address digit status is not 'reach' at step S406, then it is determined whether the address digit status is 'last' at step S407. If the address digit status is not 'last' at step S407, a program goes to step S409 where a message is arranged as an abnormal address process at step S409, an abnormal process message is generated at step S410 and then a program is terminated. Otherwise, if the address digit status is 'last' at step S407, an address information DB link pointer 26 of the address information DB 30 is obtained and stored at step S415. A corresponding tuple 38 of the address information DB 30 is searched using a key value of address information DB link pointer 26 of the address information DB 30 at step S416, and then corresponding address information required for a call control operation is obtained at step S417. Subsequently, a normal address process message is arranged at step S418, an execution success message is generated at step S419, and finally a program is terminated.

As apparent from the above description, an address analysis method according to the present invention determines first and second key values of the address analysis pointer determination DB 10 by analyzing an NPI and a TON of a received address informaion, and thus determines an address start link pointer 13. Then, the determined address start link pointer 13 is connected to an address link pointer 21 of the address analysis DB 20, the address link pointer 21 of the address analysis DB 20 is adapted as a first key value, and an address digit 22 of the address analysis DB 20 is adapted as a second key value in such a way that a tuple 27 of the address analysis DB 20 is searched and an address digit status is analyzed in the tuple 27. In this case, an address information DB link pointer 26 of the tuple 27 inside of the address analysis DB 20 is connected to an address information DB link pointer 31 of the address information DB 30 so that it is used as a key value for analyzing address information.

In this way, an address digit status of the tuple 27 is analyzed, an address link pointer 21 is obtained on the basis of the address digit status, corresponding address information DB link pointers 26 and 31 are obtained and stored, a corresponding tuple 38 is searched using a key value of the address information DB link pointer 31 in such a way that information of a corresponding address is obtained. Likewise, one of a called network, a called node, and a called port is determined on the basis of an analysis result of an address being received from a network or a subscriber, so that the present invention can be applicable to all kinds of address schemes.

An address analysis method and a procedure for processing an address analysis result in accordance with the present invention can be easily applicable to design/construct/manage the next generation integrated network.

The address analysis method according to the present invention can accommodate all kinds of address schemes regardless of an address type, for example, an E.164 and E.191 of ITU-T or an NSAP defined by an ISO 8348, thereby providing the next generation voice and data service as well as a wired/wireless integrated network interworking service.

Further, the address analysis method facilitates the design and construction of the next generation integrated network, and effectively manages the next generation integrated network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. Address analysis method for an integrated network service applied to an ATM (Asynchronous Transfer Mode) switching system wherein an ALS (ATM Central Switching Subsystem) and an ACS (ATM Central Switching Subsystem) are connected to each other, comprising the steps of:
    a) constructing an address analysis pointer determination database for determining an address analysis start pointer, and constructing an address analysis database for analyzing an address using the address analysis start pointer and a received address and an address information database for obtaining information of the address;
    b) determining an address analysis start link pointer in the address analysis database by analyzing the received address information; and
    c) calculating an address information database link pointer by analyzing a corresponding address digit and the determined address analysis start link pointer of the address analysis database, and obtaining information of an address corresponding to the address information database link pointer.

2. The address analysis method as set forth in claim 1, wherein the step (a) includes the steps of:
    a-1) constructing the address analysis pointer determination database comprising an NPI (Numbering Plan Identifier) field, a TON (Type Of Number) field, and an address start link pointer field;
    a-2) constructing the address analysis database comprising an address link pointer field, an address digit field, an address status field, an back address link pointer field, an next address link pointer field, and an address information DB link pointer field, and forming a double linked list structure wherein digits of each address are mutually linked; and
    a-3) constructing the address information database comprising an address information DB link pointer field, an NPI field, a TON field, a call type field, a protocol field, and address digit field, and an address length field, and allowing the address information database to be a sequential structure by the number of addresses capable of being accommodated in a system.

3. The address analysis method as set forth in claims 2, wherein:
    an address information database link pointer of a tuple inside of the address analysis database is connected to an address information database link pointer of the address information database.

4. The address analysis method as set forth in claim 2, wherein:
    the address analysis database connects a key value of the next address link pointer field of the front tuple to an address link pointer of a next tuple in order to accomplish a continuous link structure between digits in such a way that digits are linked with the next tuple on condition that the address status field is connected to the next digit field, and connects the back address link pointer field to a front address link pointer field in such a way that digits are backwardly linked to each other.

5. The address analysis method as set forth in claims 4, wherein:
    an address information database link pointer of a tuple inside of the address analysis database is connected to an address information database link pointer of the address information database.

6. The address analysis method as set forth in claim 1, wherein the step (b) includes the steps of:
    b-1) upon receiving an address analysis request signal, and storing elements of called party address information received by the address analysis request signal and a calling party protocol type; and
    b-2) calculating an address analysis start link pointer of the address analysis database by adopting a value of the NPI as a first key value of the address analysis pointer determination database and adopting a value of the TON as a second key value of the address analysis pointer determination database according the values of the NPI and the TON of the called party address information.

7. The address analysis method as set forth in claim 6, wherein:
    the first key value is '0' in case of an 'unknown' address scheme where a type of the NPI is not assigned, is '1' in case of an 'ISDN' address scheme, and is '2' in case of an 'NSAP' address scheme, and
    the second key value is '0' in case of 'unknown' address scheme where a type of the TON is not assigned, is '1' in case of an 'international number', is '2' in case of a 'national number', is '3' in case of a 'specific number', and is '4' in case of a 'terminal number' (a subscriber number).

8. The address analysis method as set forth in claim 1, wherein the step (c) includes the steps of:
    c-1) setting a 'reach_flag' indicating an analysis result status of the address digit to a 'false state';
    c-2) searching a tuple of the address analysis database by adopting the address start link pointer as a first key and adopting the address digit as a second key, and analyzing a status of an address digit corresponding to the tuple;
    c-3) if the 'reach_flag' is in a state 'true' on condition that the address digit is in a status 'none' in the step (c-2), searching a tuple of an address information database by adopting an address information database link pointer of the address information database as a key value, obtaining corresponding address information based on the searched tuple, but generating an abnormal address process message if the 'reach_flag' is in a state 'false';
    c-4) if the address digit is in a status 'next' in the step (c-2), calculating an address link pointer from the address analysis database, and repeating the step (c-2) of searching a corresponding tuple of the address analysis database using the address link pointer and the next address digit as key values;
    c-5) if the address digit is in a status 'reach' in the step (c-2), setting the 'reach flag (reach_flag)' to a state 'true', calculating and storing an address information link pointer of the address information database, and repeating the step (c-2) of searching a corresponding tuple of the address analysis database using the next address link pointer and the next address digit as key values; and c-6) if the address digit is in a status 'last' in the step (c-2), calculating and storing an address information database link pointer of the address information database, searching a corresponding tuple of the address information database using the address information database link pointer as a key value, obtaining information of corresponding address based on the searched tuple, and generating a message of the address information.

9. The address analysis method as set forth in claim 1, wherein the step (c) includes the step of:

accessing a corresponding tuple using a key value of the address digit inside of the address analysis database, and analyzing an address digit status.

10. In an ATM (Asynchronous Transfer Mode) switching system having a processor, wherein an ALS (ATM Central Switching Subsystem) and an ACS (ATM Central Switching Subsystem) are connected to each other, a computer-readable recording medium comprising:

a first function for constructing an address analysis pointer determination database for determining an address analysis start pointer, and constructing an address analysis database for analyzing an address and an address information database for calculating information of the address using the address analysis start pointer and a received address;

a second function for determining an address analysis start pointer in the address analysis pointer determination database by analyzing the received address information; and a third function for calculating an address information database link pointer by analyzing a corresponding address digit and the determined address start link pointer of the address analysis database, and obtaining information of an address corresponding to the address information database link pointer.

* * * * *